United States Patent
Gasco Nunez et al.

(10) Patent No.: US 8,911,236 B2
(45) Date of Patent: Dec. 16, 2014

(54) TRAINING METHOD AND SYSTEM COMPRISING MIXED REAL AND VIRTUAL IMAGES

(75) Inventors: Miguel Gasco Nunez, Getafe-Madrid (ES); Javier Alvarez Ortiz, Getafe-Madrid (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 852 days.

(21) Appl. No.: 12/571,962

(22) Filed: Oct. 1, 2009

(65) Prior Publication Data

US 2011/0027761 A1    Feb. 3, 2011

(30) Foreign Application Priority Data

Jul. 31, 2009   (EP) ..................................... 09382132

(51) Int. Cl.
| | | |
|---|---|---|
| G09B 9/08 | (2006.01) | |
| B64D 39/00 | (2006.01) | |
| G09B 9/042 | (2006.01) | |
| G09B 9/05 | (2006.01) | |

(52) U.S. Cl.
CPC . *G09B 9/042* (2013.01); *G09B 9/05* (2013.01)
USPC ............................. 434/30; 434/37; 244/135 A (58) Field of Classification Search
USPC .................................. 434/37, 30; 244/135 A
See application file for complete search history.

(56) References Cited

U.S. PATENT DOCUMENTS

| | | | | |
|---|---|---|---|---|
| 4,093,347 A | * | 6/1978 | La Russa | 359/630 |
| 4,645,459 A | * | 2/1987 | Graf et al. | 434/43 |
| 7,839,417 B2 | * | 11/2010 | Ebensberger et al. | 345/592 |
| 7,980,512 B1 | * | 7/2011 | Speer et al. | 244/135 A |
| 2005/0084833 A1 | * | 4/2005 | Lacey et al. | 434/262 |
| 2010/0167250 A1 | * | 7/2010 | Ryan et al. | 434/267 |
| 2010/0243812 A1 | * | 9/2010 | Gasco Nunez | 244/135 A |

OTHER PUBLICATIONS

"Advanced Aerial Refueling Trainer, Preliminary Product Overview," 2006.*
Joe Wilson, "Refueling Realism", Summer 2005.*
Nickolas Macchiarella, et al, "Augmented Reality if a Learning Paradigm . . . ", 2004 IEEE.*
"Northrop Grumman's KC-45 Aerial Refueling Boom Completes Key Flight and Performance Milestones", Jun. 30, 2008 (http://www.irconnect.com/noc/press/pages/news_releases.html?d=145520).*
Azuma, R. , "A Survey of Augemented Reality", "Prescence: Teleoperators and Virtual Environments", 1997, pp. 355-385, vol. 6, No. 4.
Azuma, R. , "Chapter 21: The challenge of making augmented reality work outdoors", "The challenge of making augmented reality work outdoors", 1999, pp. 379-390.
Azuma, R. et al. , "Recent Advances in Augmented Reality", "IEEE Computer Graphics and Applications", 2001, pp. 34-47.

(Continued)

*Primary Examiner* — Xuan Thai
*Assistant Examiner* — Michael Grant
(74) *Attorney, Agent, or Firm* — Nixon & Vanderhye P.C.

(57) ABSTRACT

Training method for the simulation of an operation performed by at least one device which is part of a real apparatus, wherein the method comprises providing to display means overlaid images under controlled depth order of a virtual apparatus, and real images of said device, and providing a simulated response to control means, based on data of the position and behavior of said device and on data of the position and behavior of said virtual apparatus.

10 Claims, 2 Drawing Sheets

(56) References Cited

OTHER PUBLICATIONS

Azuma, R. et al., "Tracking in unprepared environments for augmented reality systems", "Computers & Graphics", 1999, pp. 787-793, vol. 23, Publisher: Pergamon.

Azuma, R. et al., "A motion-stabilized outdoor augmented reality system", "IEEE", 1999, pp. 252-259.

Furmanski, C. et al., "Augmented-reality visualizations guided by cognition: Perceptual heuristics for combining visible and obscured info . . . ", "ISMAR 2002", 2002, pp. 1-11.

You, S. et al., "Orientation tracking for Outdoor Augmented Reality Registration", "Virtual Reality", 1999, pp. 36-42, Publisher: IEEE.

\* cited by examiner

TRAINING METHOD AND SYSTEM COMPRISING MIXED REAL AND VIRTUAL IMAGES

CROSS-REFERENCE TO RELATED APPLICATION

This application claims priority under 35 U.S.C. §119 to European Patent Application No. EP09382132.0 filed Jul. 31, 2009. The disclosure of the European Patent Application No. EP09382132.0 is hereby incorporated herein by reference in its entirety, for all purposes.

FIELD OF THE INVENTION

The invention relates to a training system and method thereof which uses a mixture of real images of a device which is part of a real apparatus, and images of a virtual apparatus.

BACKGROUND OF THE INVENTION

Known training simulators are based on the provision of a complete virtual environment for the operator. For example, pilot training systems comprise a cockpit optionally placed over hydraulic systems which simulate in-flight movement, wherein all visual information received by the trainee is a computer generated simulation. Thus, any interaction with a second object (e.g. a second aircraft) is completely simulated. Another example is the training with complex or industrial cranes, e.g. large construction cranes or heavy duty cranes used in ports.

Thus, with these systems the education of the operator shifts from a first stage of training under fully virtual environments to a second stage under fully real conditions, without any intermediate steps. This poses a problem because in using for the first time the real apparatus, the operator has no experience with the use and response thereof, of both the apparatus and the real environment where the apparatus operates.

This is particularly relevant with systems which pose a risk for the operator or the equipment, such as air to air refueling. The operation of air to air refueling consists in placing the distal portion of a pipe (Nozzle) inside a receptacle placed on the receiver aircraft fuselage and, once the coupling has been stabilized, dispensing the desired fuel quantity to the receiver aircraft, all this while both, receiver and tanker (i.e. the aircraft from which the fuel is transferred to the receiver, through refueling means such as a Boom), are in flight. This involves the following sequence of basic operations: (i) Receiver approach; (ii) Receiver stabilization; (iii) Contact operation; (iv) Refueling phase; (v) Disconnection; and (vi) Receiver leaving. Traditionally, refueling means of the tanker have been managed by an air refueling operator (ARO) through refuel control means that provided the control of the refueling means. Thus, air to air refueling is a difficult and risky task for both, ARO and receiver pilot. The tanker and the receiver aircraft may also be damaged during the operation. The learning and training of this operation has been made traditionally in flight because most of the actual system used direct vision. With the increasing use of indirect vision systems (e.g. low lag video system that closes the visual loop of the ARO) other training procedures are available. As mentioned before, the most widely used training system is the ground console simulation including synthetic images of a complete environment, refueling means and receivers, all animated by physical and logical simulations of the different elements involved in the maneuver.

This systems are however deficient in the recreation of the real life situations, especially given the difficult and risky nature of air to air refueling.

It would therefore be desirable to provide a training system which can recreate more accurately real life conditions, but without the risk and costs of real conditions.

An analogous situation arises when considering:
training in the use of heavy duty cranes. This machinery is capable of working with extremely heavy objects, such as containers, and requires extensive training. Thus before operating in a real situation, it would be desirable to practice with real loads (e.g. containers) but under simulated conditions, for example, with a virtual ship to be loaded, or
systems with dangerous environments such as operation of equipments and/or robots in nuclear power plants, submarine environments or outer space.

SUMMARY OF THE INVENTION

It is an object of the invention to provide an improved system and method of the type defined in the opening paragraph. In the proposed method real operations from a real apparatus and the environment are combined with virtual recreations of a virtual apparatus.

This and other objects of the invention are achieved by means of a training method for the simulation of an operation performed by at least one device which is part of a real apparatus, in accordance with claim 1, an image synthesis means in accordance with claim 7, an interaction manager means in accordance with claim 8, a training system in accordance with claim 9, and a computer program in accordance with claim 15. The particular embodiments of the invention are defined in the dependent claims.

The method of the invention provides overlaying images of a virtual apparatus with real images of a device which is part of a real apparatus, simultaneously controlling the depth order of both, the device and the virtual apparatus. At the same time it provides real time evaluation of the possibility of contact, collision or aerodynamic interference of the device and of the virtual apparatus, based on the data of the position and behavior of the device and on the simulated position and behavior of the virtual apparatus.

Thus, a first aspect of the invention is a training method for the simulation of an operation performed by at least one device which is part of a real apparatus, wherein the method comprises providing to display means (212) overlaid images under controlled depth order of a virtual apparatus, and real images of said device, and providing a simulated response to control means (210), based on data of the position and behavior of said device (205) and on data of the position and behavior of said virtual apparatus (209).

A second aspect of the invention is an image synthesis means (211) configured to receive data of the position and behavior of a device (205) which is part of a real apparatus and data of the position and behavior of a virtual apparatus (209) in order to establish the depth order of said virtual apparatus and said device and to create an image accordingly.

Thus, in order to produce the image, the image synthesis means (211) receives the data of the position and behavior (e.g. aero elastic behavior) of the device (205) and the data of the position and behavior of the virtual apparatus (209), and hence, of the relative position of both the device and the virtual apparatus.

A third aspect is an interaction manager means (206) configured to generate data on the possibility of contact, collision or aerodynamic interference (207) between a virtual apparatus and a device which is part of a real apparatus, based on data of the position and behavior of said virtual apparatus (209) and on the data of the position and behavior of said device (205).

A fourth aspect is a training system for the simulation of an operation performed by at least one device which is part of a real apparatus, the system comprising detection means (201) for taking raw images and raw data of the device (202), which are optionally transformed into data of the position and behavior of the device (205), said raw data and images of the device (202) or said data of the position and behavior of the device (205) being received by an interaction manager means (206), which is configured to simulate a response on a device control means (210) based on said data of the position and behavior of the device (205) and on data of the position and behavior of a virtual apparatus (209) generated by a virtual-apparatus simulating means (208), and wherein, said data of the position and behavior of the device (205) and said data of the position and behavior of said virtual apparatus (209) is also used by an image synthesis means (211) to establish the depth order of said virtual apparatus and said device and to create an image accordingly which is displayed in a display means (212).

A fifth aspect is a computer program adapted to execute the training method of the invention or a computer program enabling a programmable device when executing said computer program to function as a system as defined in the fourth aspect.

A sixth aspect is an apparatus (preferably, an air to air tanker) comprising at least one of an image synthesis means (211) as defined in the second aspect, an interaction manager means (206) as defined in the third aspect or a training system as defined in the fourth aspect.

Thus the present invention combines the images of a virtual apparatus with real images of a device. Such configuration prevents the risk of real life operations, since the virtual nature of the interaction prevents any real collision. One can imagine the importance of such configuration in the training of high-risk operations such as air to air refueling. This configuration also prevents any damage on the real apparatus. At the same time the controller has the opportunity of handling real devices in a real environment. The new method involves the use of different technologies assembled in a special way in order to produce a new training technique. Real time and stereo vision systems can be used. Synthetic realistic images managing the depth order pixel by pixel and simulating physical interactions provide the controller with real life simulated conditions.

The special combination of real life conditions and virtual recreations, allows training with a wide variety of apparatus, whether or not the real model is available, i.e. controllers can be trained before the real models are available. The controllers may also train under simulated hazardous conditions, such as adverse weather conditions or simulated system failures, without risk under a real environment by implementing the appropriate configuration of the system.

BRIEF DESCRIPTION OF THE DRAWINGS

These and other aspects of the invention are apparent from and will be elucidated, by way of a non-limitative examples, with reference to the embodiment(s) described hereinafter. In the drawings,
In FIG. 1 and throughout the text the numbers have the following meanings:
- 201 is "detection means"
- 202 is "raw images and raw data of the device"
- 203 is "memory accessible means"
- 204 is "image processing means"
- 205 is "data of the position and behavior of the device"
- 206 is "interaction manager means"
- 207 is "data on the possibility of contact, collision or aerodynamic interference"
- 208 is "virtual-apparatus simulating means"
- 209 is "data of the position and behavior of a virtual apparatus"
- 210 is "device control means"
- 211 is "image synthesis means"
- 212 is "display means"
- 213 is "Stereo coordination means"

DETAILED DESCRIPTION OF EMBODIMENTS

Once the object of the invention has been outlined, specific non-limitative embodiments are described hereinafter.

Real Apparatus, Device and Virtual Apparatus

In the present invention the real apparatus can be a vehicle, such as an aircraft (e.g. airplane, helicopter or a spaceship) or machinery, such as large construction cranes or heavy duty cranes used in ports. The device can be any extension of the real apparatus which requires control by a controller, and which is configured to interact with a second apparatus (in the present invention represented by the virtual apparatus). For example, the training system of the invention can be applied to a spaceship (real apparatus) which comprises a mechanical arm (device) intended to transport equipment from the spaceship to an orbital station (virtual apparatus) or to fix a satellite (virtual apparatus). Another example can be the training in the use of port cranes (real apparatus) wherein a system of cables and hooks is used to load and unload containers (device) into and from ships (virtual apparatus).

A preferred embodiment of the invention is an in-flight training method for the simulation of air to air refueling operations. In a further embodiment, in the in-flight training method for the simulation of air to air refueling operations, said real apparatus is a tanker, said device is refueling means of said tanker, and said virtual apparatus is a virtual receiver.

A further embodiment is an in-flight training method for the simulation of air to air refueling operations, which comprises providing to display means (212) overlaid images under controlled depth order of a virtual receiver and of real refueling means, and providing a simulated response to refuel control means (210) based on data of the position and behavior of real refueling means and on data of the position and behavior of said virtual receiver.

According to these embodiments, multiple receiver operations can be simulated. All the above advantages make this system ideal for tactical maneuvers. In addition the system reduces the overall costs of training, especially the costs of operation of a real receiver aircraft, and provides a valuable intermediate training system between fully virtual ground systems and the fully real training on air.

In a further embodiment of the invention, the refueling conditions are controlled by different means. For example, certain conditions can be managed by flight by wire (FBW) systems typically present in tankers or those which can be specifically modified for the purposes of the invention, and which can physically simulate flight conditions on the refueling means.

As mentioned above, the method and system of the invention allows training with a wide variety of apparatus. Thus, in the specific case of air to air refueling it is immediately apparent to the reader that the refueling training and system of the invention is equally applicable to Boom and to Hose & Drogue refueling systems by applying minimum modifications. Thus, the system of the invention provides high flexibility of the training conditions. It can be integrated in virtually any kind of tanker, whether an airplane or a helicopter, or any other type of aircraft tanker. It can even be used for multiple simultaneous or consecutive boom or Hose & Drogue operations.

Figure 2:
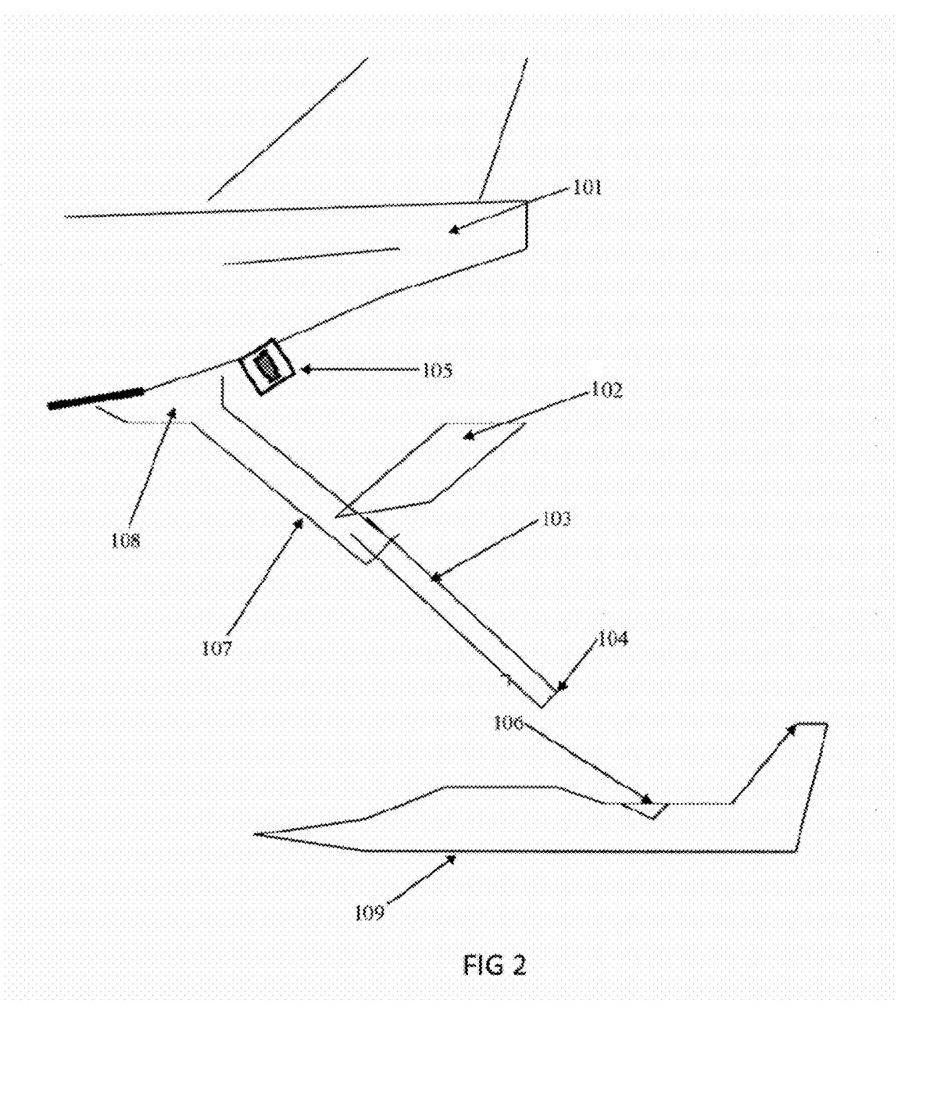
FIG. 2 is an schematic non-limitative representation of a boom air to air refueling system. The skilled person will immediately recognize that some of the elements described therein can be placed in a different position.

In reference to this embodiment, FIG. 2 shows a receiver (109) and a tanker (101), which carries the boom system. A typical boom system comprises a boom gimbal (108) for the movement of the mast (107), a telescopic beam (103) responsible for the extension of the boom along the axis of the boom mast (107), having a boom nozzle (104) in its distal portion. The boom mast (107) is equipped with boom fins (102) which are used for aerodynamic control. According to an embodiment, the boom also comprise camera and detection means (105), whose images are displayed in a display system [not shown], usually output monitors. In order to refuel, the boom nozzle (104) is connected to the receptacle (106) of the receiver aircraft (109).

Figure 1:
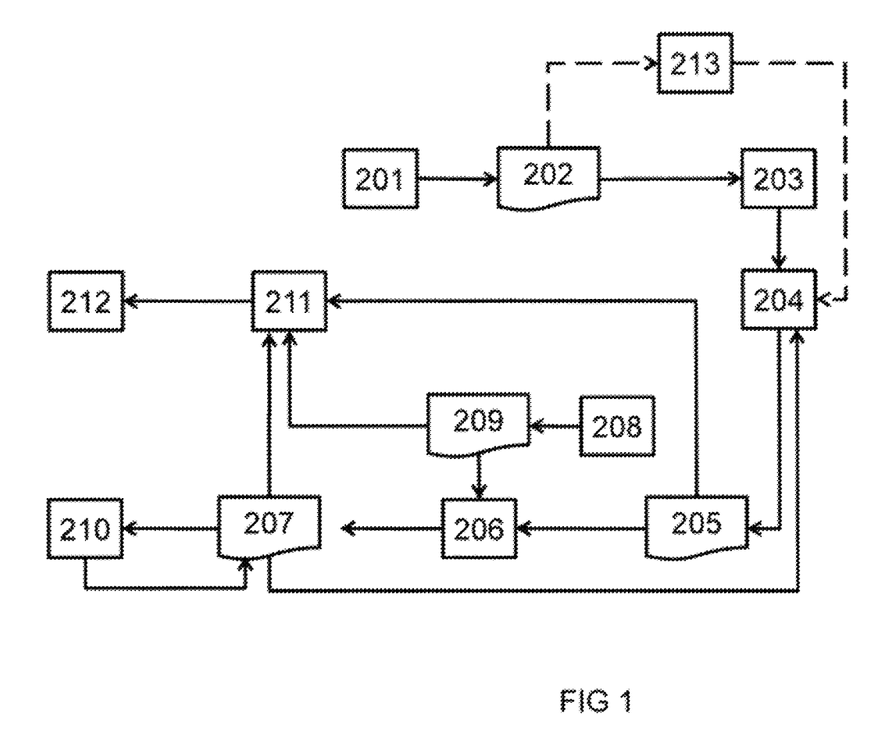
FIG. 1 is a schematic non-limitative flow chart of the processes and means involved in the training system of the invention.

In one embodiment, the method of the invention comprises capturing raw images and raw data of said device (202) with detection means (201), and optionally generating data of the position and behavior of said device (205), said raw images and raw data of said device (202) or data of the position and behavior of said device (205) being sent to an interaction manager means (206), which generates data on the possibility of contact, collision or aerodynamic interference (207) between the virtual apparatus and said device also using the data of the position and behavior of said virtual apparatus (209) which is sent by a virtual-apparatus simulating means (208), said data on the possibility of contact, collision or aerodynamic interference (207) being used to simulate a response on a device control means (210), and wherein, said data on the possibility of contact, collision or aerodynamic interference (207), said data of the position and behavior of the device (205) and said data of the position and behavior of said virtual apparatus (209) is transferred to an image synthesis means (211) which establishes the depth order of said virtual apparatus and said device and creates an image accordingly which is displayed in a display means (212).

Thus, an embodiment of the invention comprises transforming the raw data and images of the device (202) into data of the position and behavior of the device (205) before it is used by the interaction manager means (206).

In an embodiment of the invention the method comprises providing memory accessible means (203) for storing said raw images and raw data of the device (202).

A further embodiment of the invention comprises transforming said raw images and raw data of the device (202) into data of the position and behavior of the device (205) by means of an image processing means (204).

A further embodiment of the invention comprises storing said raw images and raw data of the device (202) in memory accessible means (203), which is accessible to image processing means (204) which generates data of the position and behavior of said device (205), Image Capture According to a preferred embodiment, the system of the invention is fitted with real time low lag video system to close the visual loop of the trainee. Images are preferably captured by CCD cameras generating a raster (matrix of pixels) that is saved in memory accessible means (203) by a frame grabber.

Image Processing Means (204)

As mentioned before, an embodiment of the invention comprises transforming the raw data and images of the device (202) into data of the position and behavior of the device (205) before it is used by the interaction manager means (206).

In an embodiment of the invention this transformation can be made by providing memory accessible means (203) for storing said raw images and raw data of the device (202).

A further embodiment of the invention comprises image processing means (204) configured to use said raw images and raw data to generate data of the position and behavior of the device (205).

In an embodiment of the invention transformation of raw data and images of the device (202) into data of the position and behavior of the device (205) can be made by providing memory accessible means (203) for storing said raw images and raw data of the device (202), which is accessible to image processing means (204) configured to use said raw images and raw data to generate data of the position and behavior of the device (205).

In general, the method by which the processing means (204) transforms raw images and raw data of the device into data on the position and behavior thereof (205), can be any of those known in the art. Image processing means (204) are responsible for generating the data of the position and behavior of all parts of the device (205) for every frame, including any analysis of the mechanical and structural flexibility effects, if required. The input for this stage is the raw image and raw data of the device itself (202) and the output is the set of parameters that define the position and behavior of the device (205). Such data may further include simulation data such as flexibility model based parameters. Additionally, it is possible to extract environment lighting information in order to improve the visual integration of virtual apparatus. Parameters required for illumination can be derived from general conditions information, such as the date, the latitude and longitude, altitude, etc or may be extracted by an independent GPS inertial unit. Said parameters can also be provided by sensors, such as photometres, placed on the real apparatus or the device.

The image processing means can provide enhanced precision with respect to the sensors of the device, e.g. Boom Control Unit (refueling means) in the case of air to air refueling simulation. In some cases, these sensors do not provide such accurate data of, for example, the flexibility of the device. For example, in the case of rapid maneuvers (more evident for roll than for pitch) the sensors provide poor data of the refueling means because of its flexibility. On the other hand, precision of image processing is higher than sensed data for some degrees of freedom. Thus, according to an embodiment of the invention, the image processing means are used in combination with data provided by the sensors of the device. In this way, data is provided for each degree of freedom by the most accurate source, whether it is the sensors of the device or the image processing means.

For example, the position of the Telescopic beam (103) or fin angles in an air to air refueling simulation can be obtained from the refueling means with the required accuracy. According to an embodiment of the invention, other parameters such as the torsion of the mast (107) or of the Telescopic beam (103) are better measured by the image processing means (204).

Virtual Apparatus Simulating Means (208)

The virtual apparatus simulating means (208) simulates the conditions of the virtual apparatus and provides its data regarding position and behavior (209). The simulation process may include operational controls, more or less detailed dynamic simulation and possible human modeled response if the virtual apparatus represents a human controlled vehicle or machinery. The animation of the virtual apparatus behavior may be realistically modeled in order to take into account increasingly realistic factors. For example, when the virtual apparatus is an air to air refueling receiver, the method and system of the invention may take into account factors such as its physical nature of receiver (mass, aerodynamic, . . . ), the flight control systems of the receiver, the actions of receiver pilot, including, for example, the response of the receiver pilot to PDL instructions (Pilot Director Lights), the Tanker, refueling means and receiver aerodynamic interference effects or the physical reactions forces between the refueling means and receiver in coupled flight.

Preferably, the behavior of the virtual apparatus is modeled based on real test data and experience.

When the virtual apparatus is a human controlled vehicle or machine, the method and system of the invention can be configured into an interactive training mode. According to this particular embodiment, the totally computer generated virtual apparatus is substituted with a human interface of the virtual apparatus. In this embodiment the virtual apparatus simulating means (208) comprises an interactive virtual apparatus training system managed by a trainee in interactive mode with the interaction manager means (206). Several virtual apparatus trainees or observers may be included in the scene. This can be further advantageous. Not only can the risk be reduced for the training of the controller of the real apparatus, but the controllers of both, the virtual apparatus and the real apparatus can simulate an operation interacting in real time, but without the risks of collision.

Interaction Manager Means (206)

The interaction manager means (206) uses the data of the position and behavior of the device (205) and the data of the position and behavior of the virtual apparatus (209) as input to analyze possible collisions, contacts or aerodynamic interferences between them through detailed geometrical models of both elements and recognition of tridimensional coupling conditions. The process detects and classifies this situation based on full 3D models and elaborates the response of both systems. Thus, the output is data on the possibility of contact, collision or aerodynamic interference (207).

This information can be used to improve the simulation. In an embodiment of the invention, the image synthesis means (211) also receives data on the possibility of contact, collision or aerodynamic interference (207) between both, in order to create a more realistic image.

When using stereo systems or multi camera implementations, Stereo coordination means (213) are required in order to unify the device position parameters—position and behavior of the device (205).

Device Response Simulation

For coupled or contact conditions the behavior of the device is driven by the virtual apparatus simulating means (208).

This process is especially important in the case of air to air refueling simulation, and converts the desired real refueling means evolution in command targets for, for example, the Boom Control Unit. In this stage the fins and extension retraction actuators move to provide the desired nozzle path.

In an embodiment of the invention the position of the real refueling means is determined by the tridimensional position of the virtual receiver, which becomes a target for a Flight-by-Wire system. By introducing this target as demanded, the real refueling means will continuously fit the specified targets, and the refueling means path will follow that proposed for the virtual receiver. A final correction is introduced in order to avoid the possible discrepancy between the obtained and desired nozzle position.

In this way control laws of the refueling means can be used in free flight mode or the Flight-by-Wire system can be configured to simulate on the Boom Control Unit the physical behavior simulated in coupled or contact conditions.

Image Synthesis Means (211)

The image synthesis means (211) generate synthetic images of virtual apparatus and composes the scene with the image captured of the device. Like the image of the device must be preserved and the virtual apparatus usually is partially occluded by the device, a special technique is necessary to product this behavior. Thus, the method of the invention comprises overlaying the image of a virtual apparatus with real images of the device. This is achieved by first capturing the raw image and raw data in real time of the device (202). In an embodiment of the present invention, raw images captured are splinted to the image processing means (204) which is capable of determining the actual position of the device, based on real time sensor information which includes data such as altitude of the device or other parameters, or position of the different parts of the device—position and behavior of the refueling means (205). In some cases, such as air to air refueling, taking into account aero elastic deformation, can improve the simulation. Thus, for example, aero elastic deformation of the refueling means (e.g. boom) and temporal mismatching can be covered by model based image processing, in order to perfectly match the silhouette of the real refueling means and preserve depth coherence in the final image.

Thus, the method and system of the invention provides overlaid images under controlled depth order, based on data of the position and behavior of the device (205) and on data of the position and behavior of the virtual apparatus (209), which recreates real life refueling conditions.

In an embodiment of the invention said image synthesis means (211) comprises one of the following steps:
 a) rendering the device by enabling a depth buffer and disabling color buffers,
 b) rendering the device over a stencil buffer, or
 c) rendering the device using the background image as texture map and vertex projected position as texture coordinates.

In a further embodiment, said image synthesis means (211) generate the synthetic image by
 (i) rendering as background image the actual video frame;
 (ii) from the parameters obtained from the device, obtaining a virtual mesh of the device by rigid body DOF parameters and deformed by a deformation model drive by image processing;
 (iii) step a), b) or c) as defined above;
 (iv) rendering a textured mesh of the virtual apparatus enabling both, color and z-buffer;
 (v) testing collisions and contact conditions between the device and the virtual apparatus mesh by use of the information received from the interaction manager means (206); and (vi) elaborating a physical evolution model of the virtual apparatus and the device.

The z-buffer is a well known algorithm that provides hidden surface removal using an auxiliary buffer for keeping the nearest z value for each pixel in the rendering process, z being the distance from the intersection of surface with pixel ray to the camera.

Disabling color buffers in step (iii) (according to option (a)) eliminates the rendered triangles from the final color image but, they appear in z-buffer. In this way not all pixels of the virtual apparatus mesh that are occluded by the device appear in the color buffer.

In other words, in order to simulate the operation, the training method of the invention first assigns as background the video frame, then apply a mask to the device on the image, and finally provides the image of the virtual apparatus. This achieves two objectives. The first one is correctly managing the pixel depth order placing the virtual apparatus and the device in the right relative position with respect to each other. Secondly this special configuration of the system allows the controller of the device to practice with the real device, and getting the feel of how the real control means (210) respond.

The digital treatment of the image is important in order to achieve realistic results. Thus, in one embodiment of the invention, high realistic shaders, such as phong stile (pixel by pixel lighting computations), can be used for rendering the virtual apparatus.

In summary, the method of the invention introduces real time and stereo vision system synthetic realistic images managing the depth order pixel by pixel and simulating physical interactions between the real elements (real apparatus, device) and the synthetic ones (virtual apparatus).

According to one embodiment, the device is rendered over stencil buffer. According to a further embodiment, the device mesh is rendered using the background image as texture map and vertex projected position as texture coordinates.

The standard or modified overlays may be generated in the image synthesis means (211) and blended with raster modified image. Alternatively, the overlays can be generated by standard video management units (VMU) process. VMU's transport the images captured to the monitors of the display means (212).

Stereo Coordination Means (213)

Usual detection means (201) for the controller of the device include stereo indirect vision means (usually cameras) in order to provide intuitive depth perception. Although processing pipelines are designed to operate over each camera input, the nature of the process requires a unified position of the device and the virtual apparatus in order to manage adequately the simulation of physical interactions (contact, collision or aerodynamic interferences). The stereo coordination means (213) recover information of both stereo channels and produces the unified data of the position and behavior of the device (205). The concept can be extended to any number of views.

In an embodiment of the invention there is more than one detection means (201) and wherein the data on the position and behavior of the device (205) is coordinated by stereo coordination means (213)

Image results can be provided to the stereo channels of vision system of the controller of the device but not to the Instructor in order to improve the safety aspect of the training operation. Actuation of the Instructor over the controls of the device returns the control over to the operator. In systems that have dual control position for the refueling means, it is advantageous to preserve one of the channels from any modification because reduces the critical role of image fusion necessary for the training.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements. 'Means', as will be apparent to a person skilled in the art, are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements.

A 'computer program' is to be understood to mean any software product stored on a computer-readable medium, such as a floppy-disk, firmware, downloadable via a network, such as the Internet, or marketable in any other manner.

The invention claimed is:

1. An in-flight training method for the simulation of an air to air refueling operation performed by using in flight a real refueling system, wherein the method comprises:
   a) providing to a display images generated using a controlled depth order arrangement of images of a virtual receiver and images of said real refueling system;
   b) generating a simulated response of a control device for the real refueling system based on real-time data of the position and behavior of said real refueling system during the simulation and based on real-time data of the position and behavior of said virtual receiver;
   c) capturing in real time images of said real refueling system with an image detector and generating data representing the real time position and behavior of said real refueling system,
   d) said images of the real refueling system and the generated data of the position and behavior of said real refueling system being used to generate the images of said real refueling system provided to the display;
   e) generating receiver data representing a position and behavior of said virtual receiver;
   f) generating in real-time an evaluation on the possibility of contact, collision or aerodynamic interference between the virtual receiver and said real refueling system using the real-time data of the position and behavior of said real refueling system and the receiver data of the position and behavior of the virtual receiver;
   g) simulating a response of a control system for the real refueling system based on the evaluation of the possibility of contact, collision or aerodynamic interference; and
   h) using said simulated response of the control system, said images and data of the position and behavior of the real refueling system and said receiver data of the position and behavior of said virtual receiver to synthesize the images of said virtual receiver and said real refueling system provided to the display.

2. An in-flight training system for the simulation of an air to air refueling operation performed by using in flight at least one real refueling device which is part of a real aircraft, the system comprising:
an image detector configured to capture raw images and position data of the real refueling device,
a computer system executing instructions stored on a non-transitory memory causing the computer to generate receiver data regarding a virtual position of a virtual receiver;
receive from the image detector said raw images and position data of the real refueling device;
simulate a virtual response of the real refueling device due to a contact, collision or aerodynamic interference between the virtual receiver and said real refueling device based on said position data of the real refueling device and the receiver data of the virtual position of the virtual receiver;
generate images of the real refueling device interacting with the virtual receiver using the raw images and the position data of the real refueling device, said receiver data of the virtual position of said virtual receiver, and the virtual response, wherein the images are generated based on a depth order of said virtual receiver and said real refueling device to create a corresponding combined image of the virtual receiver and real refueling device, and
displaying the generated images of the real refueling device interacting with the virtual receiver.

3. The system according to claim 2, wherein more than one image detector is configured to capture data regarding the position and behavior of the real refueling device.

4. The system according to claim 2, wherein data of light conditions is captured by the image detector and the data of light is used by the computer to generate the images.

5. The system according to claim 2, wherein the computer is included in an interactive virtual receiver training system operated by a human controlling the real refueling device and viewing the generated images.

6. The system according to claim 5, wherein a flight by wire system is used to simulate conditions of the real refueling device on the interactive virtual-receiver training system.

7. An in-flight training apparatus including a computer system executing instructions stored in a non-transitory memory, the computer system executes the instructions to cause the apparatus to:
collect in real time refueling system data representing positions and behaviors of a real refueling system operating in a real world;
generate in real time receiver data representing simulated positions and behaviors of a virtual receiver;
synthesize images of a simulated air-to-air refueling operation using the refueling system data and the receiver data, wherein the synthesized images depict a simulated interaction between the real refueling system and the virtual receiver;
generate in real time interaction data representative of a virtual contact or of a virtual collision between the virtual receiver and the real refueling system during the simulated interaction and based on the refueling system data and the receiver data; and
display the synthesized images and display the virtual contact or virtual collision using the interaction data representative.

8. A non-transitory computer-readable medium of computer-executable instructions for carrying out an in-flight training method for the simulation of an air-to-air refueling operation performed by using in flight at least one real refueling device, wherein the instructions, when executed by the computer, direct the computer to:
provide to a display overlaid images under controlled depth order of a virtual receiver and of said real refueling device, and provide a response to refueling control device, based on data of the position and behavior of said real refueling device and based on data of the position and behavior of said virtual receiver,
capture in real time raw images and raw data of said real refueling device with a camera, and collect data indicative of the position and behavior of said real refueling device,
generate data indicating a virtual position of the virtual receiver,
determine in real time whether a virtual contact, virtual collision or other virtual aerodynamic interference occurs between the virtual receiver and said real refueling device using the generated data indicating the position and behavior of said virtual receiver and said collected data indicating the position and behavior of said real refueling device;
simulate the response of the refueling control device based on the determination of the virtual contact, virtual collision or the other virtual aerodynamic interference.

9. A method of training a trainee during flight of a real tanker aircraft adapted for air to air refueling of a receiver aircraft, and comprising a real boom system operable by the trainee, including a boom mast and a telescoping boom beam extensible along an axis of the boom mast with a boom nozzle at a distal end of the telescoping boom beam, the boom mast being coupled with a boom gimbal for movement of the mast in operation of the boom system, the real boom system also comprising a camera and detector adapted to generate real-time real images of the boom mast and telescoping boom beam, and a display system for displaying said real images of the boom mast and telescoping boom beam to the trainee, said method comprising:
displaying in the display system said real-time real images of the boom mast and telescoping boom beam in operation, and
generating virtual images of a virtual receiver aircraft with a virtual refueling receptacle;
overlaying the real images of the boom mast and telescoping boom beam of the real tanker aircraft and the virtual images of the virtual receiver aircraft and virtual refueling receptacle thereof in a controlled depth order to synthesize images showing a simulated response of the real boom system and the virtual receiver aircraft based on position and behavior of the real boom system and the position and behavior of the virtual receiver aircraft and virtual refueling receptacle, wherein the synthesized images are shown on the display system in a closed visual loop.

10. A training method which simulates an air to air refueling operation between a virtual receiver aircraft and a real refueling system operating in the real world, wherein the method comprises:
capturing refueling system data representing the real time position and behavior of the real refueling system in the real world as the real refueling system is operated by a person;
generating by a computer a virtual receiver aircraft in a virtual world simulating the air to air refueling operation;
generating by the computer images of the real refueling system and the virtual receiver aircraft, wherein the generated images depict the position and the behavior of the real refueling system being operated by the person;

displaying the generated images as the person operates the real refueling system, wherein the generated images show a simulated interaction between the real refueling system and the virtual receiver aircraft.

* * * * *